(12) United States Patent
Yata et al.

(10) Patent No.: US 8,970,461 B2
(45) Date of Patent: Mar. 3, 2015

(54) DISPLAY AND LIGHTING DEVICE

(75) Inventors: Tatsuya Yata, Gifu (JP); Kenji Tanase, Gifu (JP); Susumu Kimura, Kanagawa (JP); Takafumi Suzuki, Kanagawa (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 388 days.

(21) Appl. No.: 13/398,565

(22) Filed: Feb. 16, 2012

(65) Prior Publication Data

US 2012/0229531 A1    Sep. 13, 2012

(30) Foreign Application Priority Data

Mar. 8, 2011  (JP) ................. 2011-050132

(51) Int. Cl.
   *G09G 3/36* (2006.01)
   *G02F 1/1335* (2006.01)
   *G09G 5/02* (2006.01)

(52) U.S. Cl.
   CPC ........ *G02F 1/1336* (2013.01); *G02F 1/133553* (2013.01); *G02F 1/133555* (2013.01); *G02F 2001/133616* (2013.01)
   USPC ............................... 345/87; 345/697; 349/62

(58) Field of Classification Search
   CPC ............ G02F 1/133553; G02F 1/1336; G02F 2001/133616; G02F 1/133555; G02F 1/133526; G02F 1/133504; G02B 5/1876; G02B 5/32; G02B 27/0018
   USPC ................... 345/87–104, 204–215, 690–699
   See application file for complete search history.

(56) References Cited

U.S. PATENT DOCUMENTS

| | | | | |
|---|---|---|---|---|
| 5,408,344 A | * | 4/1995 | Takiguchi et al. | 349/57 |
| 5,999,282 A | * | 12/1999 | Suzuki et al. | 359/20 |
| 6,048,071 A | * | 4/2000 | Sawayama | 362/603 |
| 6,483,613 B1 | * | 11/2002 | Woodgate et al. | 359/19 |
| 6,842,279 B2 | * | 1/2005 | Amundson | 359/296 |
| 7,777,945 B2 | * | 8/2010 | Whitehead et al. | 359/443 |
| 2004/0008398 A1 | * | 1/2004 | Amundson | 359/265 |
| 2006/0066802 A1 | * | 3/2006 | Kitayama | 349/156 |

(Continued)

FOREIGN PATENT DOCUMENTS

| | | |
|---|---|---|
| JP | 2000-275595 | 10/2000 |
| JP | 2000-338488 | 12/2000 |
| JP | 2000-338894 | 12/2000 |

(Continued)

OTHER PUBLICATIONS

European Patent Office, Extended European Search Report issued in connection with European Patent Application No. 12000687.9, dated Jul. 3, 2012. (10 pages).

Japanese Office Action issued Sep. 2, 2014 in corresponding Japanese Application No. 2011-050132.

*Primary Examiner* — Patrick F Marinelli

(74) *Attorney, Agent, or Firm* — K&L Gates LLP (57) ABSTRACT

Disclosed herein is a display including: a reflective image display section having pixels arranged in the display region; and a lighting device adapted to irradiate light to the image display section from diagonally in front, in which the light scattering characteristics in the display region are angle-dependent, and in which the lighting device irradiates light whose intensity distribution is adjusted so that when the display region displaying an image having an equal gray level is viewed from a given viewing position, the image luminance is uniform.

5 Claims, 7 Drawing Sheets

(56) References Cited

U.S. PATENT DOCUMENTS

2012/0250158 A1* 10/2012 Tamaki et al. ............... 359/599
2013/0229603 A1* 9/2013 Tamaki et al. ............... 349/113

FOREIGN PATENT DOCUMENTS

| JP | 2002-229019 | 8/2002 |
| JP | 2005-183148 | 7/2005 |

* cited by examiner

DISPLAY AND LIGHTING DEVICE

CROSS REFERENCES TO RELATED APPLICATIONS

The present application claims priority to Japanese Priority Patent Application JP 2011-050132 filed in the Japan Patent Office on Mar. 8, 2011, the entire content of which is hereby incorporated by reference.

BACKGROUND

The present disclosure relates to a display. The present disclosure also relates to a lighting device.

A reflective image display section is known that achieves image display by controlling the reflectance of external light. For example, a reflective liquid crystal display panel includes a reflective membrane adapted to reflect external light and displays an image by controlling the reflectance of external light with its liquid crystal layer. A display having a reflective image display section displays an image by using external light, thus contributing to reduced power consumption, reduced thickness and reduced weight and finding application as such, for example, for a personal digital assistance.

However, a display having a reflective image display section diminishes in visibility under a low illuminance condition. Therefore, a display has been proposed that has a lighting device adapted to irradiate light to the reflective image display section. In a lighting device having a light guide plate covering the front side of the image display section, however, part of light from the lighting device leaks toward the viewer in an 'as-is' manner. This leads to reduced image contrast. Further, because an image is viewed via a light guide plate, the light guide plate affects the visibility of the image.

On the other hand, a lighting device such as book light does not develop the above problem thanks to the absence of a light guide plate covering the front side of the image display section. For example, Japanese Patent Laid-Open Nos. 2000-338488 and 2002-229019 describe lighting devices with no light guide plate covering the front side of the image display section.

SUMMARY

In a display having a reflective image display section, it is possible, for example, to enhance the reflectance for a given viewing position by rendering the light scattering characteristics of the image display section in the display region angle-dependent, thus compensating for reduced visibility caused by reduced reflectance associated with color display and preventing the image from being viewed from outside the given viewing position. However, irradiating light from a lighting device such as book light to the image display section having angle-dependent light scattering characteristics leads to non-uniform intensity of scattered light in the display region, thus resulting in significantly non-uniform luminance of the image viewed from the given viewing position.

In light of the foregoing, it is desirable to provide a display having a reflective image display section capable of contributing to improved uniformity in luminance of the image viewed from a given viewing position despite the angle dependence of the light scattering characteristics in the display region. It is also desirable to provide a lighting device operable to irradiate light to the reflective image display section.

According to an embodiment of the present disclosure, there is provided a display that includes a reflective image display section and a lighting device. The reflective image display section has pixels arranged in its display region. The lighting device irradiates light to the image display section from diagonally in front.

The light scattering characteristics in the display region are angle-dependent.

The lighting device irradiates light whose intensity distribution is adjusted so that when the display region displaying an image having an equal gray level is viewed from a given viewing position, the image luminance is uniform.

According to the embodiment of the present disclosure, there is provided a lighting device that irradiates light from diagonally in front to a reflective image display section having angle-dependent light scattering characteristics in the display region.

The lighting device irradiates light whose intensity distribution is adjusted so that when the display region displaying an image having an equal gray level is viewed from a given viewing position, the image luminance is uniform.

The lighting device used in the display according to an embodiment of the present disclosure or the lighting device according to another embodiment of the present disclosure irradiates light to a reflective image display section from diagonally in front. Both of these lighting devices irradiate light whose intensity distribution is adjusted so that when the display region displaying an image having an equal gray level is viewed from a given viewing position, the image luminance is uniform.

Additional features and advantages are described herein, and will be apparent from the following Detailed Description and the figures.

DETAILED DESCRIPTION

A description will be given below of the present disclosure based on an embodiment with reference to the accompanying drawings. The present disclosure is not limited to the embodiment, and various values and materials used in the embodiment are illustrative. In the description given below, the same components or those having the same functionality are denoted by the same reference numerals, and redundant description will be omitted. It should be noted that the description will be given in the following order:

1. General Description of the Display and Lighting Device According to an Embodiment of the Present Disclosure
2. First Embodiment (others)

General Description of the Display and Lighting Device According to an Embodiment of the Present Disclosure The lighting device according to an embodiment of the present disclosure or the lighting device used in the display according to the embodiment of the present disclosure (these will be hereinafter simply referred to as the lighting device according to an embodiment of the present disclosure) irradiates light whose intensity distribution is adjusted so that when the display region displaying an image having an equal gray level is viewed from a given viewing position, the image luminance is uniform. Here, the expression "the image luminance is uniform" includes not only a case in which the image luminance is strictly uniform but also a case in which the image luminance is practically uniform.

In this case, the lighting device may be arranged at a given position where, when the lighting device irradiates light, light from the pixels is scattered to reach a given viewing position. The above condition is satisfied not only if, when light is irradiated, a given viewing position is included in the range of angles at which light scatters from the pixels along one side of the display region on the side of the lighting device, but also if the given viewing position is included in the range of angles at which light is scattered from the pixels along the side of the display region opposed to that on the side of the lighting device.

The lighting device according to the embodiment of the present disclosure having the above preferred configuration may include a plurality of light sources so that the intensity distribution of light irradiated onto the display region is adjusted by controlling the light emission of each of the light sources. Alternatively, the lighting device may include a light source and light adjustment section so that the intensity distribution of light irradiated from the light source onto the display region is adjusted by the light adjustment section.

Among light sources making up the lighting device are light-emitting diodes (LED), cold or hot cathode fluorescent lamps, electroluminescence (EL) devices and ordinary lamps. If the lighting device includes a plurality of light sources, it is preferred that LEDs should be used as light sources. For example, LEDs may be arranged in a rectangular matrix form so that the light emission of each of the LEDs is controlled.

A lens or neutral density (ND) filter arranged on the emission side of the light source is an example of the light adjustment section. The intensity distribution of light irradiated onto the display region is adjusted by adjusting the lens directivity or the density distribution of the ND filter. Alternatively, the reflectance of the reflector adapted to reflect light from the light source may have a similar distribution. The light adjustment section may include, for example, a well-known optical material.

In the embodiment which will be described later, a reflective liquid crystal panel having an anisotropic scattering film attached to the surface is used as an image display section. The liquid crystal panel may be monochrome or color.

The anisotropic scattering film includes, for example, extremely small regions having different refractive indices that are alternately formed in such a manner as to be oriented at a given angle relative to the surface. This film has angle-dependent light scattering characteristics which allow light from a given direction to pass through the film in an 'as-is' manner while scattering light from other directions. In other words, the haze thereof is angle-dependent. This film is made, for example, of a photo-hardening composition containing two types of compounds having different refractive indices, and obtained by hardening a membrane of this composition by irradiating the membrane with light from a given direction.

The anisotropic scattering film is not specifically limited in configuration, and it is only necessary to select, as appropriate, a suitable film to match the specification and design of the display. It is possible to cause the anisotropic scattering film not to scatter light irradiated from the lighting device and cause the film to scatter light reflected from the liquid crystal panel by establishing a suitable relationship between light irradiated from the lighting device and the anisotropic scattering film.

The reflective liquid crystal display panel includes, for example, a front panel, rear panel and liquid crystal material. The front panel includes a transparent common electrode. The rear panel includes pixel electrodes. The liquid crystal material is provided between the front and rear panels. The pixel electrodes may reflect light. Alternatively, transparent pixel electrodes and a reflective membrane may be used in combination so that the reflective membrane reflects light. The liquid crystal display panel is not specifically limited in configuration. The same panel may be driven in the so-called TN (Twisted Nematic) mode. Alternatively, the same panel may be driven in the VA (Vertical Alignment) or IPS (In-Plane Switching) mode.

It should be noted that a semi-transmissive liquid crystal panel is well known as an image display section having the properties of both reflective and transmissive image display sections. This semi-transmissive liquid crystal panel has both reflective and transmissive display regions in the pixels. Such a panel may be used. That is, the term "reflective image display section" includes a semi-transmissive image display section.

The image display section is not specifically limited in shape and may be horizontally or vertically long rectangular. When the pixel count of the image display section or M by N is expressed as (M, N), (640, 480), (800, 600) and (1024, 768) are among a few examples of (M, N) values, i.e., image display resolutions, of a horizontally long rectangular image display section. For a vertically long rectangular image display section, on the other hand, the resolutions obtained by interchanging the (M, N) values of a horizontally long rectangular image display section are among examples of image display resolutions. However, the pixel count is not limited to these values.

The drive circuits adapted to drive the image display section and those adapted to drive the lighting device can include a variety of circuits. These circuits can include well-known circuit elements.

Each of various conditions given in the present specification is satisfied not only when it strictly holds but also when it practically holds. Presence of various variations caused by design or manufacturing reasons is tolerated.

First Embodiment

A first embodiment relates to a display and lighting device according to the present disclosure.

Figure 1:
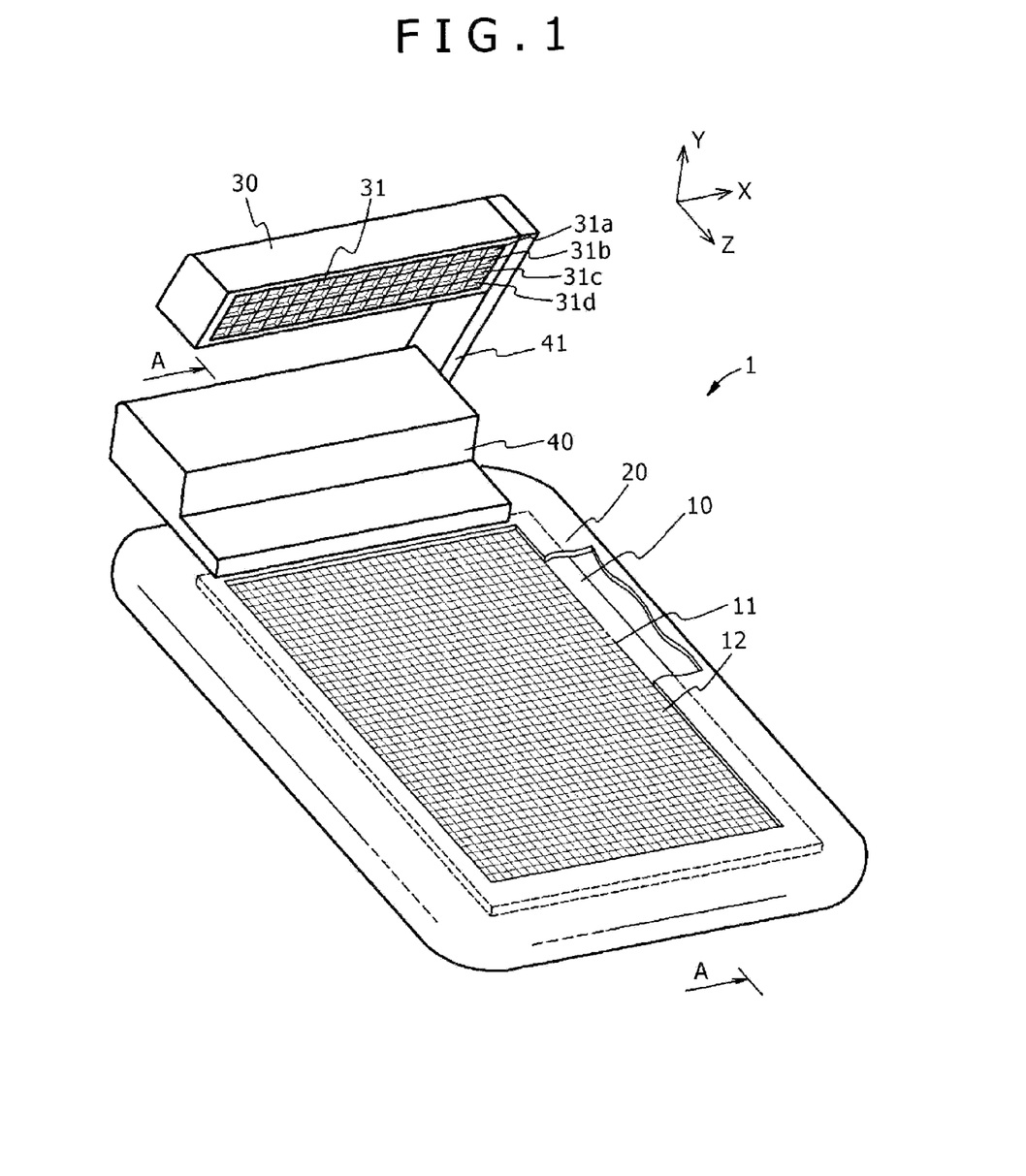
FIG. 1 is a schematic perspective view of a display according to a first embodiment of the present disclosure.

FIG. 1 is a schematic perspective view of a display according to the first embodiment.

As illustrated in FIG. 1, a display 1 includes a reflective image display section 10 and lighting device 30. The reflective image display section 10 has pixels 12 arranged in a display region 11. The lighting device 30 irradiates light to the image display section 10 from diagonally in front. The same section 10 includes a reflective liquid crystal display panel and is incorporated in an enclosure 20. The lighting device 30 is mounted to the edge portion of an arm section 41 extending from a support section 40. The support section 40 is attachably and detachably mounted at one end of the enclosure 20 by an unshown holding section. It should be noted that part of the enclosure 20 is cut away in FIG. 1. For convenience of explanation, we assume that the display region 11 is parallel with the XZ plane, and that the side on which the image is viewed is the positive Y direction.

The lighting device 30 includes a plurality of light sources 31. Each of the light sources 31 includes, for example, a white LED and makes up one of a plurality of rows arranged along the X axis. In the example shown in FIG. 1, four rows of the light sources 31 are planarly arranged. The light sources included in the first row are denoted by reference numerals $31_a$, and those in the second row by reference numerals $31_b$. Similarly, the light sources included in the third row are denoted by reference numerals $31_c$, and those in the fourth row by reference numerals $31_d$.

As will be described later, the light scattering characteristics in the display region 11 are angle-dependent. The lighting device 30 irradiates light whose intensity distribution is adjusted so that when the display region displaying an image having an equal gray level is viewed from a given viewing position, the image luminance is uniform. The lighting device 30 is arranged at a given position where, when the lighting device irradiates light, light from the pixels 12 is scattered to reach a given viewing position. Further, the intensity distribution of light irradiated onto the display region 11 is adjusted by controlling the light emission of each of the light sources 31.

Figure 2A:
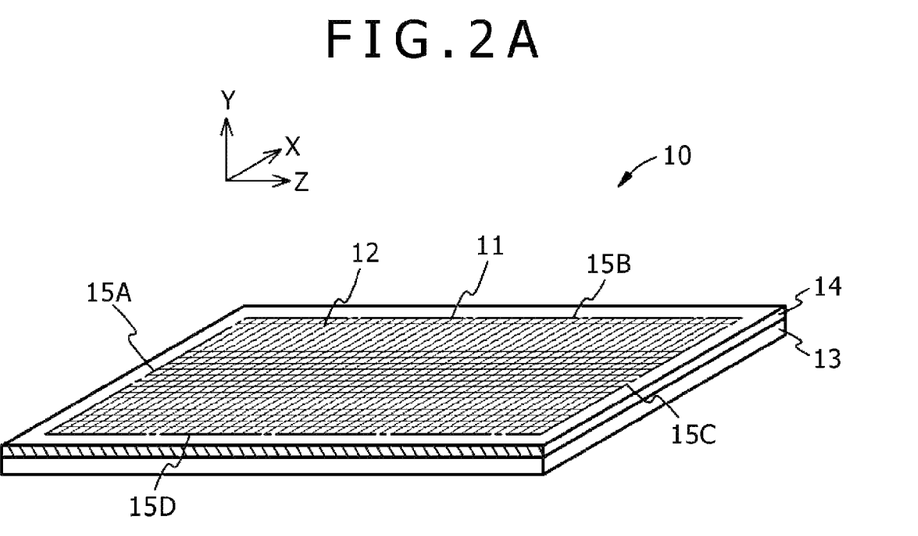
FIG. 2A is a schematic perspective view of a reflective image display section.
Figure 2B:
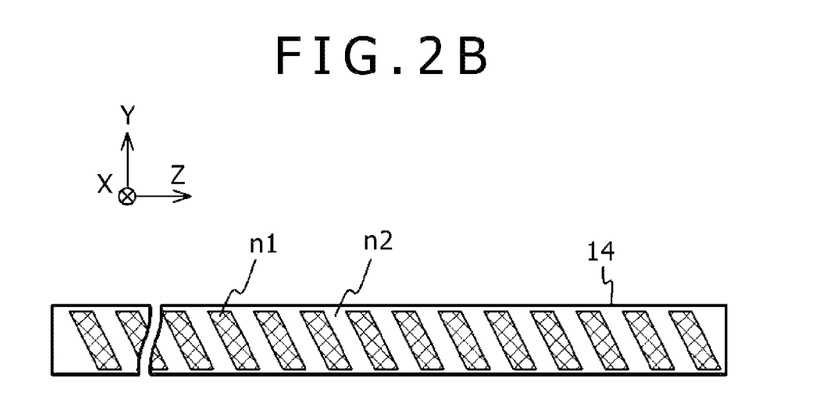
FIG. 2B is a schematic cross-sectional view of an anisotropic scattering film.

FIG. 2A is a schematic perspective view of the reflective image display section. FIG. 2B is a schematic cross-sectional view of an anisotropic scattering film.

As illustrated in FIG. 2A, the reflective image display section 10 includes a reflective liquid crystal display panel 13 to the surface of which an anisotropic scattering film 14 is affixed. The display region 11 is rectangular. The sides of the display region 11 are denoted by reference numerals 15A, 15B, 15C and 15D. The side 15A is on the side of the lighting device 30. The side 15C is opposed to the side 15A. For example, the sides 15A and 15C are about 12 cm in length, and the sides 15B and 15D are about 16 cm in length.

The anisotropic scattering film 14 is, for example, about 0.1 mm in thickness and includes extremely small regions having different refractive indices that are alternately formed in such a manner as to be oriented at a given angle relative to the surface as illustrated in FIG. 2B. These extremely small regions are formed to extend in the X direction in the figure. The same film 14 has angle-dependent light scattering characteristics which allow light from a given direction to pass through the film in an 'as-is' manner while scattering light from other directions because of the difference between refractive indices n1 and n2 in the region. Basically, incident light in parallel with the regions oriented at a given angle passes through the film in an 'as-is' manner while scattering light from other directions in such a manner that scattered light is assigned a given dependence commensurate with the angle.

The scattering characteristics of light from the image display section 10, and more specifically the scattering range of light and the intensity of scattered light, are affected by the incidence angle of incident light. A description will be given below of the light scattering characteristics, for example, when light enters the image display section 10 with white displayed across the entire screen of the same section 10 with reference to FIGS. 3A to 3C.

Figure 3A:
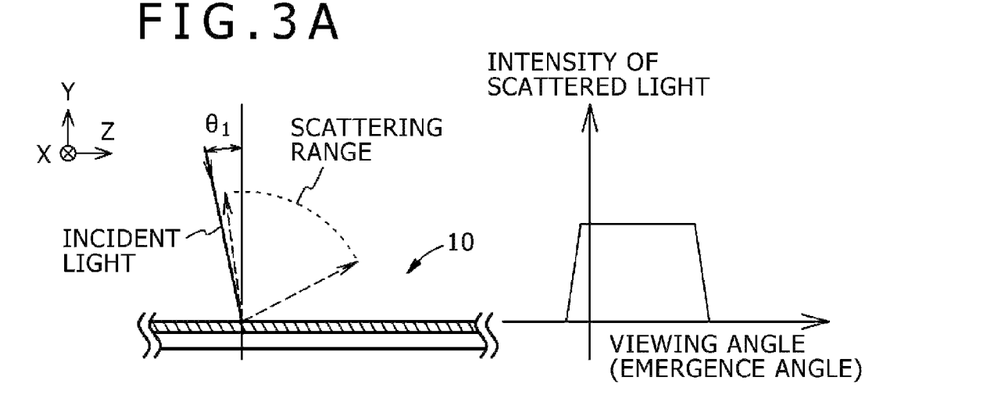
FIGS. 3A to 3C are schematic diagrams and schematic graphs for describing the relationship between incident light and scattered light in a reflective image display section.
Figure 3B:
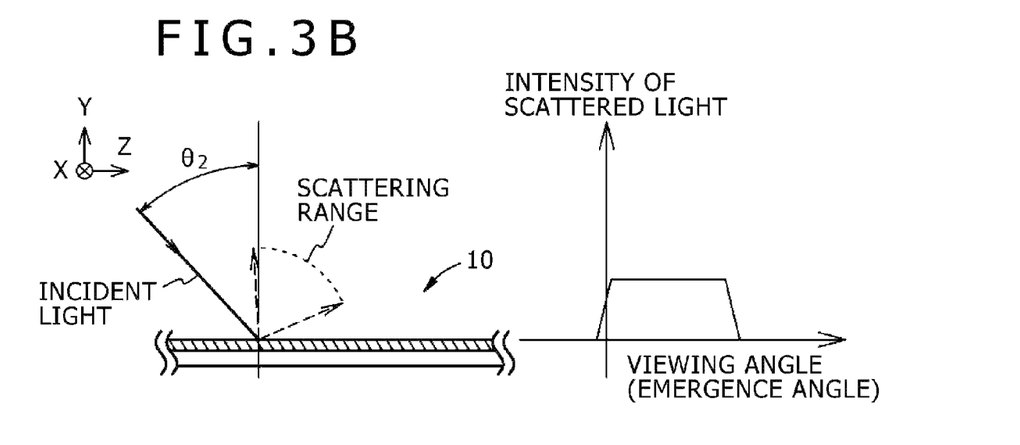
Figure 3C:
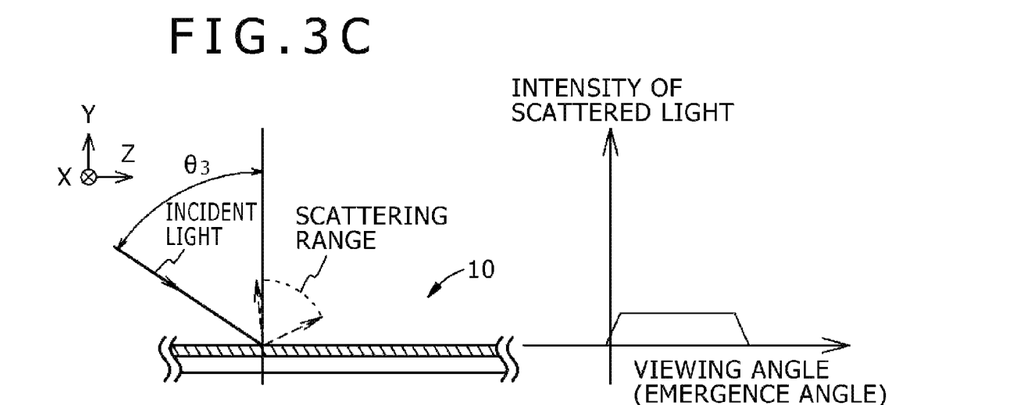

FIGS. 3A to 3C are schematic diagrams and schematic graphs for describing the relationship between incident light and scattered light in the reflective image display section.

For convenience of explanation, we assume that incident light propagates in the YZ plane in the schematic diagrams shown at right in FIGS. 3A to 3C. On the other hand, scattered light is scattered in an approximately conical manner with the YZ plane serving as a symmetry plane. In FIGS. 3A to 3C, however, light is shown to propagate in the YZ plane. For convenience of illustration, a description was given to the effect that light scatters on the surface of the image display section 10. Practically, however, light that has transmitted through the anisotropic scattering film 14 reaches the liquid crystal display panel 13, and light is scattered based on light reflected from the same panel 13. The schematic graphs at left show the relationships between the emergence angle of scattered light and the intensity thereof.

As illustrated in FIG. 3A, if an incidence angle $\theta_1$ is small, intense light is scattered. If light enters the image display section 10 at an incidence angle $\theta_2$ which is greater than $\theta_1$, the scattered light becomes less intense (refer to FIG. 3B). If light enters the image display section 10 at an incidence angle $\theta_3$ which is greater than $\theta_2$, the scattered light becomes even less intense (refer to FIG. 3C). Further, if the incidence angle becomes greater, the range of angles at which light is scattered (hereinafter may be simply referred to as the scattering range) tends to lean to the right.

If an ordinary lighting device having a linear light source such as fluorescent lamp is used, it is difficult to ensure uniform luminance of the displayed image. A description will be given below of the luminance of an image when an ordinary lighting device is used with reference to FIG. 4.

Figure 4:
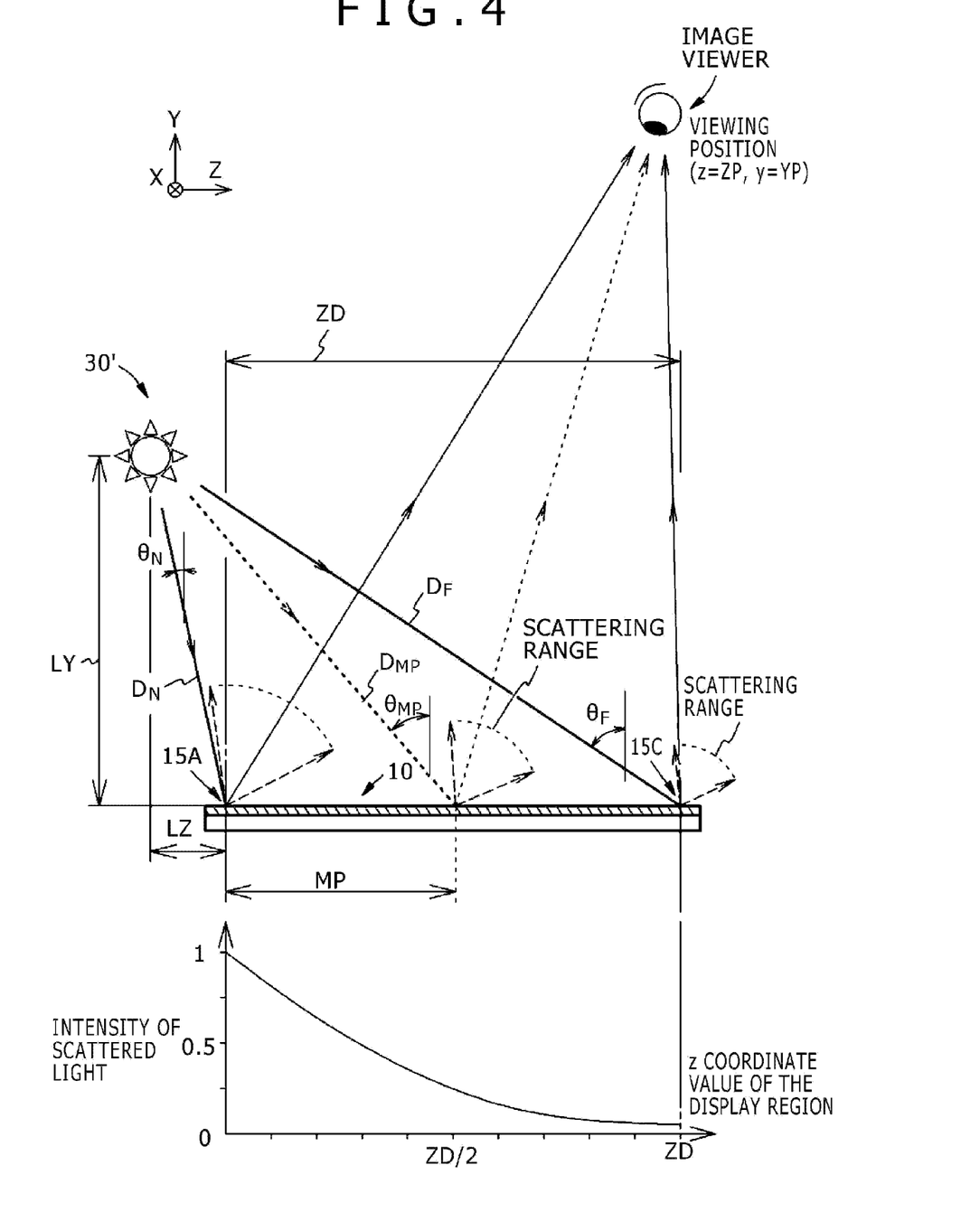
FIG. 4 is a schematic diagram for describing, for example, the intensity of scattered light viewed at a viewing position when a lighting device having an ordinary light source is used.

FIG. 4 is a schematic diagram for describing, for example, the intensity of scattered light viewed at a viewing position when an ordinary lighting device is used. More specifically, FIG. 4 is a schematic diagram illustrating the behavior of light in the YZ plane including line A-A shown in FIG. 1 when the lighting device 30 shown in FIG. 1 is replaced with a lighting device 30' having a linear light source such as fluorescent lamp that extends in the X direction. It should be noted that we assume, for example, that white is displayed across the entire screen of the image display section 10.

In FIG. 4 and in FIGS. 5 to 7 which will be described later, the position of the side 15A shown in FIG. 2 serves as a reference of coordinates. On the other hand, the length of the display region 11 in the Z direction (in other words, the length of the side 15B or 15D shown in FIG. 2) is denoted by reference numeral ZD.

In FIG. 4, the lighting device 30' is located at a distance LZ in the negative Z direction and at a distance LY in the positive Y direction from the reference of coordinates. On the other hand, the given viewing position is located at a distance ZP in the positive Z direction and at a distance YP in the positive Y direction from the reference of coordinates. For example, the distance ZP is about 13 cm, and the distance YP is about 30 cm.

When the scattered light from the pixels 12 arranged in the display region 11 reaches the given viewing position (z=ZP, y=YP), the image viewer can visually perceive the entire displayed image. The incidence angle of incident light from the lighting device 30' onto the side 15A is denoted by reference numeral $\theta_N$, and the distance from the lighting device 30' by reference numeral $D_N$. The incidence angle of incident light onto the side 15C opposed to the side 15A is denoted by reference numeral $\theta_F$, and the distance from the lighting device 30' by reference numeral $D_F$. Further, the incidence angle of incident light falling on the portion at a distance MP in the positive Z direction from the side 15A is denoted by reference numeral $\theta_{MP}$, and the distance from the lighting device 30' by reference numeral $D_{MP}$. In this case, it is obvious from FIG. 4 that the relationship $\theta_N < \theta_{MP} < \theta_F$ holds, and that the relationship $D_N < D_{MP} < D_F$ holds.

Normally, if, when light is irradiated, the given viewing position is included in the scattering range of light from the pixels 12 located along the side 15A of the display region 11 on the side of the lighting device, and if the given viewing position is included in the scattering range of light from the pixels 12 located along the side 15C opposed to the side of the display region 11 on the side of the lighting device, the scattered light from each of the pixels 12 reaches the given viewing position (z=ZP, y=YP).

As described with reference to FIGS. 3A to 3C, the greater the incidence angle, the more the scattering range tends to lean to the right in FIGS. 3A to 3C. The position (z=–LZ, y=LY) of the lighting device 30' shown in FIG. 4 is set in consideration of the above tendency so that the conditions that the given viewing position is included not only in the scattering range of incident light falling on the side 15A at the incidence angle $\theta_N$ but also in the scattering range of incident light falling on the side 15C at the incidence angle $\theta_F$ are satisfied. The scattered light from the pixels 12 reaches the given viewing position, thus making it possible to visually perceive the entire image.

As described with reference to FIGS. 3A to 3C, however, the greater the incidence angle, the less intense the scattered light becomes. Further, the intensity of incident light falling on the display region 11 is qualitatively inversely proportional to the square of distance from the lighting device. Because of the synergetic effect of the above, the light scattered from the pixels 12 near the side 15C significantly diminishes in intensity relative to the light scattered from the pixels 12 near the side 15A.

The graph shown at the bottom of FIG. 4 schematically illustrates the relationship between the z coordinate value of the display region and the intensity of scattered light viewed at the viewing position with respect to the intensity of light scattered from the pixels 12 near the side 15A. The intensity of scattered light is maximum when z=0 (in other words, the position of the side 15A). The greater the z coordinate, the more the scattered light diminishes in intensity. Although varying depending on the design of the image display section 10, the intensity of light scattered from the pixels 12 near the side 15C is more or less several percent of the intensity of light scattered from the pixels 12 near the side 15A. As described above, when an ordinary lighting device is used, the luminance of the image changes significantly according to the z coordinate value, thus making it difficult to ensure uniform luminance of the displayed image.

A description will be given next of the desirable type of intensity distribution possessed by light irradiated from the lighting device for improved uniformity in luminance of the displayed image with reference to FIG. 5.

Figure 5:
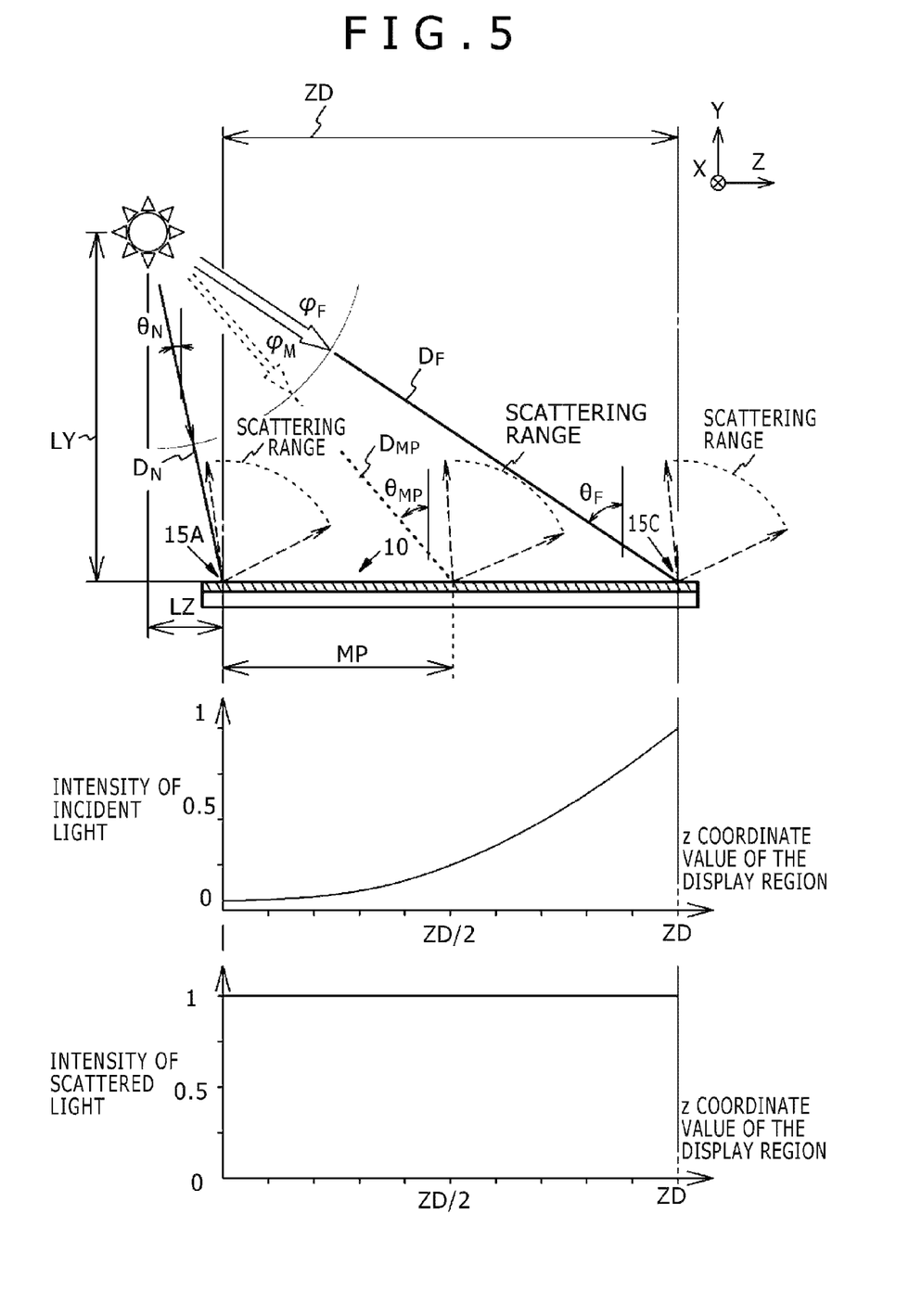
FIG. 5 is a schematic diagram for describing the intensity distribution of incident light adapted to even out the luminance of an image.

FIG. 5 is a schematic diagram for describing the intensity distribution of incident light adapted to even out the luminance of an image.

As illustrated in FIG. 5, when light irradiated to the side 15C, that irradiated to the portion whose z coordinate is MP and that irradiated to the side 15A are denoted respectively by reference numerals $\Phi_F$, $\Phi_{MP}$ and $\Phi_N$, it is possible to provide improved uniformity in luminance of the image if the relationship $\Phi_F < \Phi_{MP} < \Phi_N$ holds in terms of light intensity.

That is, it is only necessary to assign the intensity distribution as shown in the graph at the middle of FIG. 5 to the intensity of incident light so as to compensate for the change in intensity of scattered light shown at the bottom of FIG. 4. The graph shown at the middle of FIG. 5 schematically illustrates the relationship between the z coordinate value of the display region and the intensity of incident light falling on that position with respect to the intensity of incident light falling on the pixels 12 near the side 15A.

More specifically, when the function representing the graph shown at the bottom of FIG. 4 is denoted by $f_1(z)$, that representing the graph shown at the middle of FIG. 5 by $f_2(z)$ and a certain constant by $L_{Const}$, the relationship $f_2(z)=L_{Const}/f_1(Z)$ holds.

It is possible to maintain the intensity of scattered light uniform as illustrated at the bottom of FIG. 5 by irradiating light in such a manner that the intensity distribution thereof is as expressed by the function $f_2(z)$. This makes it possible to provide improved uniformity of the luminance of the displayed image. The graph shown at the bottom of FIG. 5 schematically illustrates the relationship between the z coordinate value of the display region and the intensity of scattered light viewed at the viewing position with respect to the intensity of light scattered from the pixels 12 near the side 15A when the intensity distribution as shown in the graph at the middle of FIG. 5 is assigned to the intensity of incident light.

In the first embodiment, the intensity distribution of light irradiated onto the display region 11 is controlled by controlling the amount of light emitted by each of the light sources 31 of the lighting device 30. A description will be given below of the manner in which the light sources are controlled with reference to FIG. 6.

Figure 6:
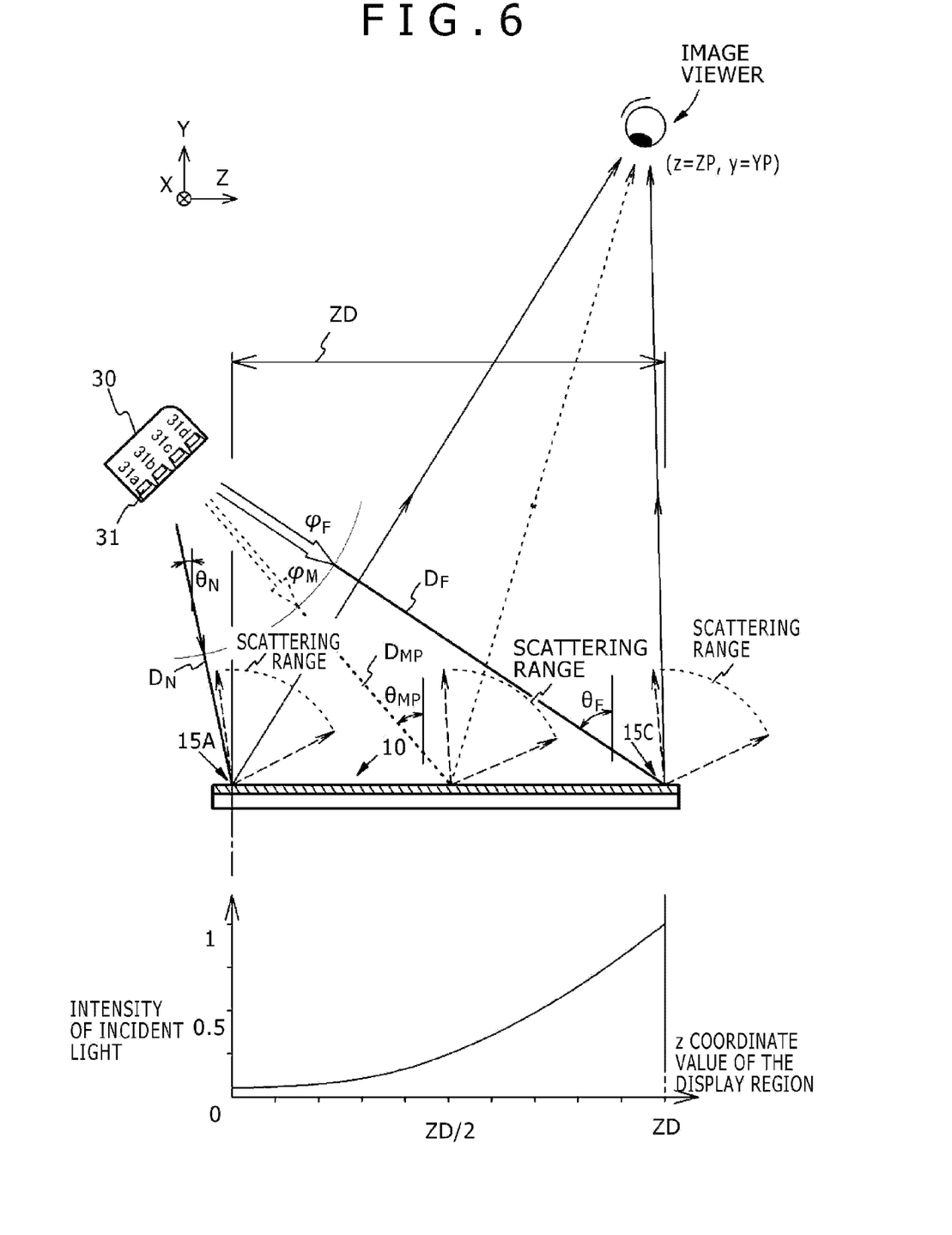
FIG. 6 is a schematic diagram for describing how light sources are controlled in the lighting device according to the first embodiment.

FIG. 6 is a schematic diagram for describing how the light sources are controlled in the lighting device used in the first embodiment.

The lighting device 30 used in the first embodiment includes four rows of the light sources 31. Therefore, the intensity distribution of light irradiated onto the display region 11 is adjusted by controlling the light emission of each of the light sources 31. Qualitatively, the amounts of light emitted by the light sources $31_a$, $31_b$, $31_c$ and $31_d$ are set so that the relationship $31_a < 31_b < 31_c < 31_d$ holds, and that the relationship $31_a \ll 31_d$ also holds. It is possible to provide improved uniformity in luminance of the displayed image by controlling the light emission of the light sources 31 so that the incident light has an intensity distribution as shown at the bottom of FIG. 6.

It should be noted that regularly reflected light of light from the light sources 31 may be visually perceived although this may not be the case depending on the manner in which the surface of the image display section is treated. In such a case, it is only necessary to set the position of the lighting device 30 so that regularly reflected light does not reach the viewing position. Basically, it is only necessary to satisfy the condition that light regularly reflected at the side 15A travels even more toward the positive Z side than the viewing position (z=ZP, y=YP).

A description will be given next of a modification example of the first embodiment with reference to FIG. 7. The schematic perspective view of the display according to the modification example is the same as FIG. 1 except that the lighting device 30 is replaced with a lighting device 130.

Figure 7:
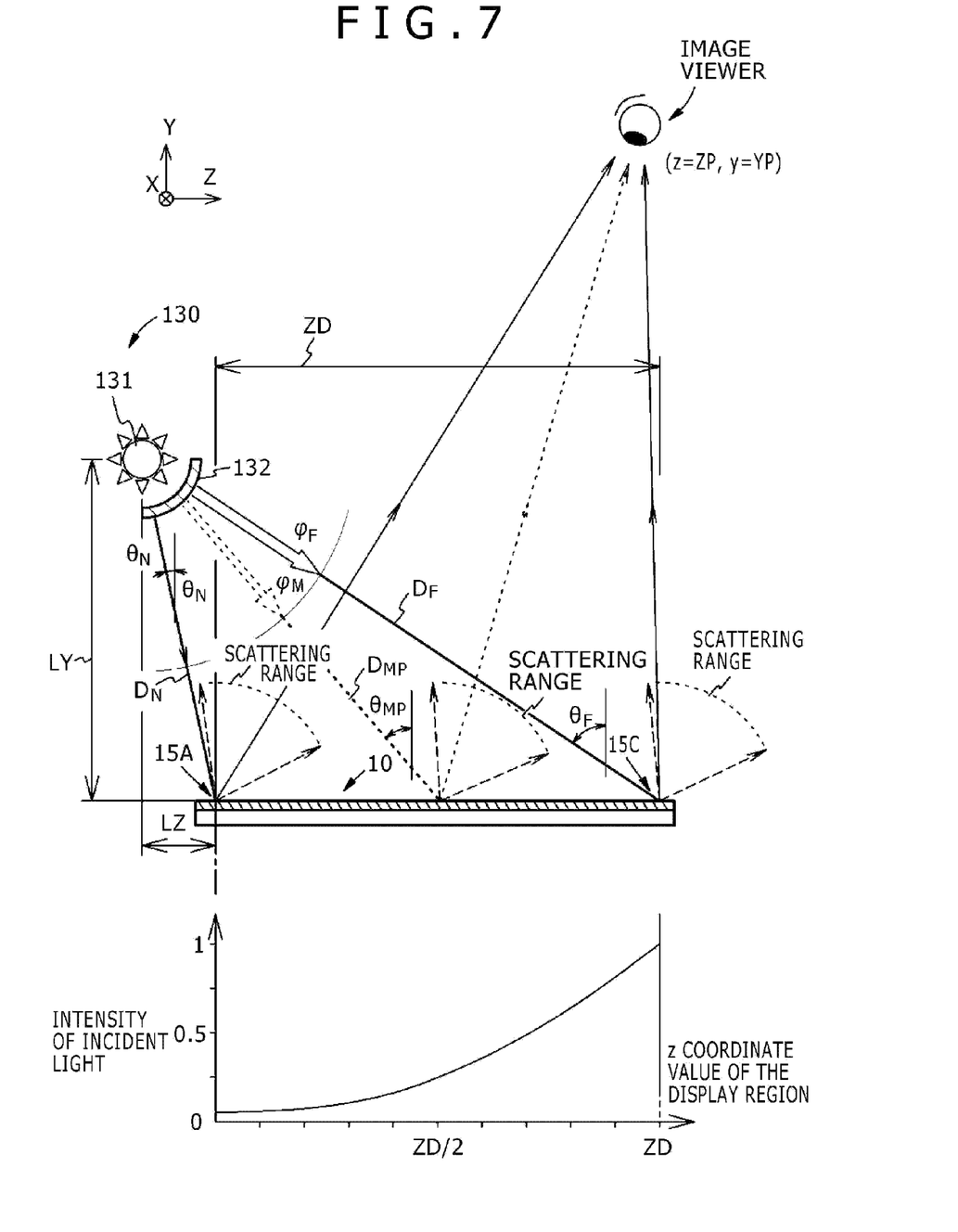
FIG. 7 is a schematic diagram for describing the intensity distribution of incident light in a modification example of the first embodiment.

FIG. 7 is a schematic diagram for describing the intensity distribution of incident light in the modification example of the first embodiment.

In the modification example, the lighting device 130 includes a linear light source 131 and light adjustment section 132. The linear light source 131 is, for example, a fluorescent lamp that extends along the X axis. The light adjustment section 132 includes, for example, an ND filter having a given transmittance distribution. The intensity distribution of light irradiated from the light source 131 onto the display region 11 is adjusted by the light adjustment section 132, thus allowing for light having an intensity distribution as shown at the bottom of FIG. 7 to be irradiated onto the display region 11. This contributes to improved uniformity in image luminance for the same reason as described with reference to FIG. 5.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display comprising:
   a reflective image display section having a display region in which pixels are arranged; and
   a lighting device that irradiates light to the reflective image display section from diagonally in front, wherein
   light scattering characteristics in the display region have angle dependence in which the greater an incident angle with respect to a direction perpendicular to a surface of the display region is, the weaker an intensity of scattered light becomes,
   the lighting device irradiates light whose intensity distribution is adjusted so that when the display region displaying an image having an equal gray level is viewed from a given viewing position, image luminance of the image is uniform, and
   the lighting device irradiates light whose intensity distribution is adjusted so that an intensity of light having a small incident angle with respect to the direction perpendicular to the surface of the display region is less than that of light having a large incident angle with respect to the direction perpendicular to the surface of the display region.

2. The display of claim 1, wherein
   the lighting device is arranged at a given position where, when the lighting device irradiates light, light from the pixels is scattered to reach the given viewing position.

3. The display of claim 1, wherein
   the lighting device has a plurality of light sources, and
   the intensity distribution of light irradiated onto the display region is adjusted by controlling light emission of each of the light sources.

4. The display of claim 1, wherein
   the lighting device has a light source and a light adjustment section, and
   the intensity distribution of light irradiated onto the display region is adjusted by the light adjustment section.

5. A lighting device that:
   irradiates light to a reflective image display section having a display region, light scattering characteristics in the display region having angle dependence in which the greater an incident angle with respect to a direction perpendicular to a surface of the display region is, the weaker an intensity of scattered light becomes;
   irradiates light whose intensity distribution is adjusted so that when the display region displaying an image having an equal gray level is viewed from a given viewing position, image luminance of the image is uniform, and
   irradiates light whose intensity distribution is adjusted so that an intensity of light having a small incident angle with respect to the direction perpendicular to the surface of the display region is less than that of light having a large incident angle with respect to the direction perpendicular to the surface of the display region.

* * * * *